United States Patent [19]

Ryan et al.

[11] Patent Number: 4,686,019

[45] Date of Patent: Aug. 11, 1987

[54] DISSOLUTION OF $PuO_2$ OR $NpO_2$ USING ELECTROLYTICALLY REGENERATED REAGENTS

[75] Inventors: Jack L. Ryan, West Richland; Lane A. Bray, Richland; Allyn L. Boldt, Kennewick, all of Wash.

[73] Assignee: Exxon Research and Engineering Company, Florham Park, N.J.

[21] Appl. No.: 655,324

[22] Filed: Sep. 26, 1984

Related U.S. Application Data

[63] Continuation of Ser. No. 357,171, Mar. 11, 1982, abandoned.

[51] Int. Cl.$^4$ .......................... C25C 1/22; C25C 3/34; G12C 19/44; G12C 19/46
[52] U.S. Cl. ...................................... 204/1.5; 204/252; 252/626; 252/627; 423/2; 423/3; 423/20; 423/22; 423/249; 423/251
[58] Field of Search .......................... 204/1.5, 252–253, 204/267, 129.1; 423/251, 249, 222, 20, 3, 4, 8, 11; 252/626, 627; 422/62

[56] References Cited

U.S. PATENT DOCUMENTS

| | | | |
|---|---|---|---|
| 3,490,999 | 1/1970 | Raviv et al. | 204/1.5 |
| 3,891,741 | 6/1975 | Carlin et al. | 423/49 |
| 3,922,231 | 11/1975 | Carlin et al. | 423/2 |
| 3,948,735 | 4/1976 | Hayden et al. | 204/1.5 |
| 3,976,775 | 8/1976 | Tallent | 423/251 |
| 4,021,313 | 5/1977 | Hausberger et al. | 204/1.5 |
| 4,069,293 | 1/1978 | Tallent | 204/1.5 |
| 4,193,853 | 3/1980 | Childs et al. | 204/129.95 |
| 4,272,247 | 6/1981 | Strain et al. | 422/62 |
| 4,333,912 | 6/1982 | Mills et al. | 252/627 |

FOREIGN PATENT DOCUMENTS

| | | | |
|---|---|---|---|
| 2814765 | 10/1978 | Fed. Rep. of Germany | 423/251 |
| 2929122 | 2/1981 | Fed. Rep. of Germany | 204/1.5 |
| 0861700 | 2/1961 | United Kingdom | 204/1.5 |

OTHER PUBLICATIONS

Scargill, D. 1974, Process for the Purification of Concentrated Plutonium Solutions, Report OKAEA, Harwell, Oxon, England, 35 pages.

Scheitlin et al., 1980, Recovery of Plutonium from HEPA Filters by Ce(IV)-Promoted Dissolution of $PuO_2$ and Recycle of the Cerium Promoter, Oak Ridge National Laboratory, ORNL/TM-6802.

Primary Examiner—John F. Terapane
Assistant Examiner—Howard J. Locker
Attorney, Agent, or Firm—Ronald D. Hantman; Joseph J. Dvorak

[57] ABSTRACT

A process for dissolving $PuO_2$, $NpO_2$, or fuel containing $PuO_2$ and/or $NpO_2$ in acid, particularly nitric acid by electrolytically continuously maintaining an oxidizing regenerable reagent. The regenerable reagent may be added to the mixture of oxide(s) and nitric acid. Alternately, it may already be present as a fission product or other nuclear reaction product in irradiated nuclear reactor fuel, in which case it need not be added to the nitric acid.

2 Claims, No Drawings

DISSOLUTION OF PUO₂ OR NPO₂ USING ELECTROLYTICALLY REGENERATED REAGENTS

This is a continuation of application Ser. No. 357,171, filed 3/11/82 (abandoned).

BACKGROUND OF THE INVENTION

This invention relates to a process for dissolving plutonium dioxide and/or neptunium dioxide in acid, particularly nitric acid.

One of the problems encountered in manufacturing of nuclear fuel and the reprocessing of irradiated fuel involving plutonium dioxide is the extreme difficulty of dissolving refractory forms of this oxide. This problem is usually encountered when trying to dissolve spent nuclear fuel which was originally fabricated from mixed oxides, i.e., $UO_2$, the recovery of scrap during fabrication recovery from waste products such as incinerator ash, or when dissolving $PuO_2$ in order to fabricate mixed oxide fuel by the co-precipitation method. Although $PuO_2$ is difficult to dissolve, $UO_2$ dissolves readily in nitric acid.

Mixed oxide fuels may be fabricated by various methods. For example, the oxides may be combined by mechanically blending of the oxides or co-precipitation of the constituent oxides. In order to fabricate mixed oxide fuel by co-precipitation, $PuO_2$ may first be dissolved and then precipitated. The mixed oxide fuel is used in the core of nuclear reactors just as is $UO_2$ nuclear fuel containing U(235). During operation of the nuclear reactor, the Pu(239) and U(235) fission forming numerous fission products, which include a number of strong absorbents for neutrons which interfere with the nuclear reactions (neutron poisons). If, as is usually the case, U(238) is present in the fuel and/or in blankets, Pu(239) is formed. On continued exposure, the Pu(239) is converted to higher isotopes of plutonium, including Pu(241) some of which decays by beta decay, forming americium, Am(241). The fuel must be reprocessed to remove the fission products and recover uranium and plutonium. In order to reprocess the fuel by, say, the Purex process, the $PuO_2$ must again be dissolved, together with the $UO_2$.

The dissolution of the mixed oxide material, $PuO_2$—$UO_2$, is affected by several factors such as (1) the percentage of $PuO_2$, (2) the method of fabrication, and (3) the irradiation level. It has been found that although $UO_2$ dissolves in $HNO_3$, $PuO_2$ does not dissolve readily in $HNO_3$ depending on the above factors. Usually the presence of fluoride ion is required for complete dissolution, but this, in turn, causes corrosion problems.

As discussed above, the difficulty in dissolving $PuO_2$ in irradiated fuel is usually encountered in the dissolution of irradiated fuel that was originally fabrication from mixed oxides. However, some $PuO_3$ that is produced by neutron absorption in U(238) during irradiation of $UO_2$ nuclear fuel may also be difficult to dissolve.

Neptunium (237) is used to prepare plutonium (238). The latter is used as a power source, particularly in space applications. $NpO_2$ is subjected to neutron irradiation forming $PuO_2$. The mixture is then dissolved and the plutonium and neptunium separated chemically. Like $PuO_2$, $NpO_2$ is difficult to dissolve in nitric acid.

D. E. Horner et al., ORNL/TM-4716 (August 1977), summarized a large amount of work done at Oak Ridge on "Cerium-Promoted Dissolution of $PuO_2$ and $PuO_2$—$UO_2$ in Nitric Acid". They show the importance of keeping the ratio of $Ce^{4+}/Ce^{3+}$ high, and suggest (Page 15) that this be done by "continuous reoxidation" by ozone or in an electrolytic oxidation cell in a circuit with the dissolver. They also disclosed the adverse effects of ruthenium on the $PuO_2$ dissolution and stated (Page 29): "These results lead to the conclusion that the use of $Ce^{4+}$ as a dissolution promoter for difficulty soluble irradiated fuel residues would not be feasible unless some way could be found to remove all the ruthenium prior to or during the dissolution."

SUMMARY OF THE INVENTION

The present invention, broadly, is a process for electrolytically dissolving plutonium dioxide, neptunium dioxide, and mixtures of actinide dioxides in an aqueous medium. Plutonium dioxide for neptunium dioxide and nitric acid are placed in an aqueous medium in an electrolytic cell containing an anode and a cathode. A regenerable reagent soluble in the aqueous medium which is a compound selected from the group consisting of Ce, Ag, Co and Am compounds is also present in the cell. Then a potential is impressed upon the cell for a period of time sufficient to dissolve substantially all of the plutonium dioxide or neptunium dioxide.

A preferred embodiment of the invention is a process for electrolytically dissolving irradiated reactor fuel in a dissolver solution, which already contains a regenerable reagent, produced by irradiation of the fuel.

The fuel and nitric acid are placed in an electrolytic cell containing an anode and a cathode and a potential is impressed upon the cell for a period of time sufficient to dissolve substantially all of the fuel. It is highly desirable that the anode and cathode be in separate compartments, separated by a diffusion barrier. The fuel is placed in the anode compartment.

When applied to either irradiated or unirradiated fuel, the simultaneous dissolution and electrolytic oxidation has the advantage, as compared to the ORNL suggestion of separate dissolution and oxidation, of maintaining the catalyst constantly at its highest valence level.

The simultaneous dissolution and oxidation, when applied to irradiated fuel, has the further advantage of converting any ruthenium present into the volatile compound $RuO_4$, which vaporizes and is removed from the solution. It is important that it be led away from the dissolver before it has the opportunity to decompose, forming solid $RuO_2$. This is facilitated by sparging the dissolver with air or other carrier gas.

DESCRIPTION OF THE PREFERRED EMBODIMENT

An actinide dioxide mixture including plutonium dioxide and/or neptunium dioxide may be dissolved in an aqueous medium containing nitric acid using a regenerable reagent. The actinide dioxide, nitric acid and a regenerable reagent are placed in an electrolytic cell and a potential applied for a time sufficient to dissolve substantially all of the plutonium and/or neptunium dioxide. The reagent is regenerated by electrolysis in the electrolytic cell.

The quantity of nitric acid required must be sufficient to meet the stoichiometric requirements for actinide nitrate formation. For example, if the actinide dioxide is plutonium dioxide, two moles of nitric acid are needed per mole of plutonium oxide. However, excess nitric acid is desirable to prevent polymerization of plutonium nitrate, which depends on the final plutonium nitrate concentration and final temperature. A concentration of about 0.5M to about 8M, preferably 1M to 4M nitric acid gives satisfactory results.

As regenerable reagents, cerium, cobalt, silver and americium are suitable. In the reprocessing of irradiated fuels, cerium, silver and americium are preferred since they are present in used dissolver solutions, some of which may be recycled. In the production of mixed oxide fuel, the uranium dioxide and plutonium dioxide may be dissolved and co-precipitated by the introduction of ammonia. This forms ammonium diuranate and hydrous plutonium oxide. Cerium and americium would also precipitate if present. However, silver and cobalt form soluble complexes with ammonia and are retained in the solution, from which they may be separately recovered by known methods. Silver is particularly outstanding in its ability to catalyze dissolution at low temperatures, e.g. 25° C.

The reagents must be present in the form of those compounds that are soluble in the aqueous medium containing nitric acid. The nitrates are the obvious choice.

Because the reagents are regenerable, they need only be present in catalytic amounts. If the reagent is cerium, or silver, a workable minimum concentration is about 0.0005M minimum. However, process economics and other operating criteria suggest a preferred minimum of about 0.005M concentration for cerium and silver. There is no upper limit, so far as opertiveness is concerned.

Cobalt appears to be effective at a minimum concentration of about 0.005M, but appears to give a higher rate of dissolution at about 0.05M, perhaps due to its reduction by water.

Americium appears to be moderately effective at the very low concentrations of 0.00005 and 0.0001M, but the optimum proportions have not been determined.

A sufficient potential to practice the process of the present invention is one that will continuously evolve $O_2$ from a platinum anode, higher potentials simply waste electricity and solution by electrolysis.

The temperature at which the dissolution may be carried out may depend on which regenerable reagent is used. If cerium is the reagent, then a temperature range of 50° to 100° C. will suffice. However, a temperature range of 90° to 100° C. is preferred. If the reagent is silver, then a temperature range of 25° to 80° C. will be operative with the lower portions of the range preferred. The two catalysts, silver and cerium, exhibit different behavior in respect to temperature. Cerium, as such, is not affected by temperature, at least within the range specified above, and the dissolution follows the usual course of increased reaction speed with increase in temperature. The rate increases by a factor of about 1.7 for each 10° C. increase in temperature. With silver, however, there are two competing effects. Ag(II) is reduced to Ag(I) by water and the rate of this reduction increases with temperature. At the same time, there is the normal tendency of the rate of dissolution to increase with temperature. As a result, dissolution rates were found to be much the same at 25° and 80° C. The rate at 25° C. is spectacular, exceeding that of the cerium-catalyzed dissolution at that temperature by a factor of 100. It is possible that some temperature between 25° and 80° C. might give still higher dissolution rates.

Cobalt, like silver, is reduced by water, though at a lesser rate, so that the overall effect more resembles that observed with cerium.

The examples given below show the high rates of dissolution obtained. Example 4 shows that 0.0510 grams was dissolved in 20 ml of 4M $HNO_3$ solution in 30–50 minutes using Ce as the regenerable reagent or an average of less than 8 minutes per mg of $PuO_2$.

The dissolution of irradiated fuel is particularly amenable to the process of the present invention. Irradiated fuel includes materials in the fission and nuclear reaction products that can function as regenerable reagents. In this case, it is usually not necessary to add a reagent to the electrolytic cell. Of course, this would depend on whether the fuel had been irradiated long enough to product a sufficient quantity of regenerable reagents among the fission and reaction products. Typical power reactor exposures are sufficient. In making up the synthetic dissolver solutions an exposure of 33,000 MWd/T and a decay time of 365 days after discharge were assumed.

Another useful application of the present invention is its use in preparing mixed oxide fuels. As discussed above, one method for fabricating mixed oxide fuels is to dissolve $PuO_2$ and $UO_2$ and then to co-precipitate the Pu and U. $PuO_2$ is first dissolved by the method of the present invention. Ammonia precipitation is then used to precipitate the Pu and U to prepare an ammonium diuranate (ADU)-hydrous plutonium oxide mixed precipitate, and this is then fired and reduced to produce a homogeneous $UO_2$—$PuO_2$ mixture for reactor fuels fabrication.

A regenerable reagent is used in the dissolution step of the mixed oxide fuel preparation that can be converted to a soluble ammonia complex. For example, Ag(I) is known to form such a complex. Then the Ag-ammonia complex remains in solution after the $PuO_2$ and $UO_2$ precipitate out, with the result that the regenerable reagent used to dissolve the $PuO_2$ has been separated from the Pu. Cobalt behaves similarly to silver.

EXPERIMENTAL EXAMPLES

Materials

Plutonium dioxide was made from reactor grade plutonium and was prepared by calcination of Pu(V) oxalate at 400°–450° C. followed by recalcination at 900° C. Some of this oxide was four years old when used and had a surface area of 12.8 $m^2/g$ determined by a modified BET gas absorption method. Another batch of oxide was prepared as part of this work by calcining Pu(III) oxalate in air for 2 h at 900° C., and this had a surface area of 4.47 $m^2/g$. A small portion of this batch was recalcinated at 1700° C. in moist 8% $H_2$ in Ar followed by crushing in a mortar, and this had a surface area of 0.62 $m^2/g$. Surface areas of the freshly prepared materials agreed with the results of others for these calcination temperatures, and the surface area of the older oxide may have been affected by alpha radiation damage.

Irradiated mixed oxide fuel (5% $PuO_2$—$UO_2$) was from the Saxton reactor and had been irradiated to 26,500 MWd/tonne. This fuel had been prepared by blending, pressing, and sintering of $PuO_2$ with $UO_2$. Irradiated, enriched uranium fuel from the Shippingport reactor had been irradiated to 30,000 MWd/tonne and contained 0.5% Pu.

A synthetic dissolver solution had the composition shown in Table 1 at a concentration of 1.39M U(VI), and all other concentrations were dilutions of this. Nd was substituted for a number of elements, and Ru was added only for specified tests. The composition was based on computer calculations as set out in U.S. Government Report ORNL-4678, "The ORNL Isotope Generations and Depletion Code" (1973). An exposure of 33,000 MWd/tonne and decay time of 365 days after exposure were assumed.

TABLE 1

| Synthetic Dissolver Solution Composition | |
|---|---|
| Rd, 0.0008 M | Pr, 0.0027 |
| Sr, 0.0021 | Nd, 0.0090 |
| Y, 0.0011 | Pm, 0.00014* |
| Zr, 0.0109 | Sm, 0.0022 |
| Mo, 0.0124 | Eu, 0.00054 |
| Rh, 0.0019 | Gd, 0.00032 |
| Pd, 0.00895 | Tb, 0.000008* |
| Ag, 0.0004 | U, 1.39 |
| Cd, 0.00055 | Np, 0.00022* |
| Te, 0.0019 | Pu, 0.0452 |
| Cs, 0.0076 | Am, 0.007985* |
| Ba, 0.0041 | Cm, 0.00202* |
| La, 0.0031 | I, 0.002 |
| Ce, 0.0058 | $HNO_3$, Variable |

*Nd substituted.

Apparatus and Method

Most of the electrolytic $PuO_2$ dissolution studies, and all the irradiated fuels dissolution studies were carried out in three compartment glass cells. The cathode and anode compartments were flat bottomed and were made of 3 cm diameter borosilicate glass tubing with a short side arm connection in the center of which was a 3 cm diameter Corning glass frit of VF porosity which acted as a cell compartment separator. The tops of the compartments were female S/T ball joints onto which were clamped glass heads through which thermometers and electrode leads passed, and through which connections for condensers, gas lines, scrubbers, etc., were available as desired. A third, smaller compartment connected via a small VF porosity frit to the anode compartment was used for a standard reference electrode (a solid state electrode with a calomel half-cell internal). The anode and cathode were 6.45 $cm^2$ circular bright-Pt disks welded to 0.125 in. Pt wire, and the anode compartment contained an additional 0.125 in. wire Pt indicator electrode. The anode compartment was stirred with a Teflon-coated stirring bar, and the cell heated by placing it on a magnetic stirrer-hot plate. Applied potential was supplied through a regulated power supply, and applied voltage and solution potential across the indicator and reference electrodes were measured with high impedance digital multimeters. Amperage was measured using a shunt and a high impedance digital multimeter.

Solution potentials were measured by briefly switching off the applied voltage and measuring the potential between the Pt wire indicator electrode and the reference electrode. After correction for temperature, this potential was used to determined the Ce(IV)/Ce(III) ratio.

Other cell designs and materials including an all Ti cell, porous ceramic and anodized Ti frit cell compartment separators, and Pt plated (0.0002 in.) Ti sheet electrode materials were examined from the stand-point of current efficiency, etc., but were not used for $PuO_2$ or fuels dissolution. Several of these concepts offer potential marked improvement over the cells used.

$PuO_2$ dissolution was followed by removing small anolyte samples, immediately destroying the residual oxidant with ferrous ammonium sulfate, removing $PuO_2$ solids by centrifugation at about 1500 G, and gamma counting the clarified solution for Am(241) at about 60 kev using a high resolution Li-Drifted Ge-diode with a 4096 channel analyzer The count was compared to standards made by dissolving samples of the same $PuO_2$ in $HNO_3$—HF. The final anolyte was filtered on 0.025 μm filters, and these filters were counted in constant geometry and compared to weighed $PuO_2$ on similar filters. Occasionally the filters and $PuO_2$ were completely dissolved, and aliquots were counted and compared to solution standards. Degree of dissolution of irradiated fuel was determined by filtration of the final solutions on 0.025 μm filters followed by complete dissolution of the filters and oxide in $HNO_3$—HF and by standard radiochemical analysis.

The cathode compartment in Examples 1-6 was a small vessel having a bottom formed of a fine glass frit. The anode compartment was a larger vessel. The test solution was placed in the anode compartment. The cathode compartment was filled with 4M nitric acid and the bottom was immersed in the test solution. The cathode and anode were both formed of shiny platinum gauze. A variable DC potential was connected across the electrodes. In each experiment, the voltage was adjusted so that it was just sufficient to produce continuous evolution of oxygen at the anode.

EXAMPLE 1

Dissolution of $PuO_2$ in Nitric Acid by Electrolysis

This example involves dissolution of $PuO_2$. The $PuO_2$ used was a refractory form of pure material which had been fired at 900° C.

A test solution of 20 ml. of 4M $HNO_3$ containing 0.0550 grams of $PuO_2$ was placed in the anode compartment of the electrolytic cell. The temperature was 104° C., which was maintained during the experiment. Electrolysis at voltage sufficient to continuously evolve $O_2$ from the anode was initiated for 60 minutes. No dissolution was observed.

EXAMPLE 2

Dissolution of $PuO_2$ in Nitric Acid Containing Cerium by Electrolysis

This example involves dissolution of $PuO_2$. The $PuO_2$ used was a refractory form of pure material which had been fired at 900° C.

A test solution of 20 ml. of 4M $HNO_3$ containing 0.0058M Ce(III) and 0.0515 g $PuO_2$ was added. The temperature was 104° C. and was maintained during the experiment. Electrolysis was initiated and after 30-50 minutes, all of the $PuO_2$ solids were visibly dissolved.

The voltage was briefly reversed, reducing the Ce(IV) to Ce(III) and leaving the solution a pinkish color believed to be Pu(VI). This observation was confirmed by spectrophotometric analysis. An analysis of the dissolver solution indicated about 2 g Pu/liter.

EXAMPLE 3

Dissolution of PuO₂ in Nitric Acid Containing Silver by Electrolysis

This example involves dissolution of $PuO_2$. The $PuO_2$ used was a refractory form of pure material which had been fired at 900° C.

A test solution of 15 ml. of 4M $HNO_3$ containing 0.005M Ag(I) was prepared and 20 mg $PuO_2$ was added. The initial temperature was 104° C. and was maintained by a hot plate after electrolysis was initiated. Apparently oxidized Ag(II) was reduced rapidly because of the lack of an intense black-brown color. The hot plate was turned off and electrolysis was continued. Substantially all of the $PuO_2$ was dissolved in the time the solution had cooled (about 15 minutes) as indicated by usual observation, with brown-black Ag(II) persisting in solution.

EXAMPLE 4

Dissolution of PuO₂ and UO₂ in Nitric Acid Containing Cerium by Electrolysis This example shows that the dissolution of $PuO_2$ proceeds as readily in the presence of dissolved U(VI) as it did in Example 1 above.

A test solution of 20 ml. of 4M $HNO_3$ containing 1.39M U(VI), and 0.0058M Ce(III) was prepared and 0.0555 g $PuO_2$ was added. The initial temperature was 108° C. which was maintained during the experiment. Electrolysis was initiated. The solution was clear after 37 minutes and contained no trace of undissolved oxide. An analysis of the dissolver solution indicated about 2 g of Pu(VI)/liter was dissolved.

EXAMPLE 5

Dissolution of PuO₂ in UO₂ in Nitric Acid containing a sample of elements found in spent reactor fuel This example includes a test solution containing a sample of elements found in spent nuclear fuel. Spent fuel includes some elements that may serve as regenerable reagents while other elements present in the spent fuel not functioning as regenerable reagents do not inhibit the regenerative dissolving process.

A test solution of 20 ml of 4M $HNO_3$ containing 1.39MU(VI), 0.0008M Rb, 0.0076M Cs, 0.0021M Sr, 0.0041M Ba, 0.0005M Cd, 0.0109M Zr, 0.0011M Y, 0.0031M La, 0.0058M Ce, 0.0027M Pr, 0.0223M Nd was prepared and 0.0527 g $PuO_2$ was added. The initial temperature was 108° C. which was maintained during the experiment. Electrolysis was initiated. After 25-35 min. the solution was completely clear indicating substantially completed dissolution of the $PuO_2$.

EXAMPLE 6

Removal of the Regenerable Reagents from the Dissolving Mixture

The dissolution of $PuO_2$ by electrolytically regenerative reagents has been demonstrated in the examples given above. Therefore, this example will demonstrate only the removal of the regenerable reagents from the Pu and U in an ammonia precipitation step.

A solution (10 ml) containing 1M $HNO_3$, 0.5M uranyl nitrate, 5 g/l Pu(IV), 0.005M $Ag^+$, and $^{110}Ag^+$ tracer was heated to 50°-55° C. and sufficient ammonia was added to provide a final solution of about 2M in $NH_3$. The solution was digested at 50°-55° C. for 30 minutes, and the precipitated uranium and plutonium values were removed by filtration. The filter cake was then washed with a 10 ml volume of 2M $NH_3$ solution. The filter cake was then resuspended in 2M $NH_3$ solution and centrifuged. The precipitated uranium and plutonium values after re-dissolving as well as the original filtrate and both 10 ml washes were analyzed by counting the $^{110}Ag$ tracer. The decontamination factor for removal of Ag was 250 resulting in 17 ppm Ag in the product. If the second (batch) wash had been eliminated, the decontamination factor would have been 190. Material balance for the $^{110}Ag$ tracer was 101.9 percent.

EXAMPLE 7

PuO₂ Dissolution as a Function of the Ce(IV)/Ce(III) Mole Ratio

D. E. Horner at ORNL suggested that the Ce(IV)/(III) ratio was more important than the Ce(IV) concentration in controlling the dissolution rate. When the engineering and economics of the electrolytic cell were reviewed for this study, the necessity of maintaining a high solution potential was questioned.

To show the effect of the Ce(IV)/(III) mole ratio and the Ce(IV) concentration the anode solution containing 60 ml of 4M $HNO_3$+Ce(III) was oxidized to a known solution potential at 90° C. The cell was then operated only when necessary to maintain the desired voltage.

The results below show that the $PuO_2$ dissolution rate increases with an increase in the solution potential (Ce IV/III mole ratio) and confirms Horner's original observation. Using 0.05M Ce+4M $HNO_3$, greater than 90% of the $PuO_2$ dissolved in 2 hours at Ce(IV/III)=19 as compared to 61, 43, and 14% at a ratio of 10, 1, and 0.11, respectively, When the Ce(IV) concentration was maintained at 0.025M, 78 and 43% of the $PuO_2$ dissolved in 120 minutes for Ce(IV)/(III) mole ratios of 9 and 1, respectively. When the Ce(IV) concentration was maintained at 0.005M, 47 and 14% of the $PuO_2$ dissolved in 120 minutes for Ce(IV)/(III) mole ratios of 9 and 0.11, respectively. Table 2 summarizes these results at 120 minutes.

TABLE 2

| \multicolumn{4}{c}{PuO₂ Dissolution at 120 Minutes as a Function of The Ce(IV/III) Ratio and Ce(IV) Concentration} | | | |
|---|---|---|---|
| Ce(IV),M | Total Ce,M | Ratio of Ce(IV)/(III) | Percent Ce(IV) | Percent PuO₂ Dissolved |
| 0.0475 | 0.05 | 19 | 95 | 90 |
| 0.045 | 0.05 | 9 | 90 | 61 |
| 0.025 | 0.05 | 1 | 50 | 43 |
| 0.005 | 0.05 | 0.11 | 10 | 14 |
| 0.025 | 0.0278 | 9 | 91 | 78 |
| 0.0045 | 0.005 | 9 | 90 | 47 |

EXAMPLE 8

Temperature Effects

When a silver solution is anodically oxidized at 25° C., the entire solution becomes a very intense brown color. If the electrolysis is carried out at progressively increasing temperatures, the intensity of the color decreases and finally the brown color persists only in the immediate vicinity of the anode. This is caused by the relatively rapid oxidation of water by oxidized silver at elevated temperatures. This behavior was demonstrated by a series of experiments in which electrolysis was carried out under varying cell temperatures under the conditions shown in Table 3. Anode compartment solution potentials versus the calomel electrode were obtained at various temperatures immediately after temporarily shutting off cell current. The measured solution potentials, corrected to the standard hydrogen electrode, decreased from 1.90 to 1.57 volts for 0.005M Ag+4M HNO$_3$ in going from 25° C. to 100° C. whereas they remained essentially constant at about 1.71 volts for 0.005M Ce. With an equimolar mixture of Ag and Ce, the measured anolyte potential decreased from 1.95 to 1.71 volts in going from 25° C. to 100° C. (Table 3) This behavior reflects the fact that the rapid reaction of Ag(II) with water (unlike Ce(IV)) prevents an appreciable fraction of the Ag being in the oxidized state at any time. A solution potential of 1.57 volts at 100° C. corresponds to a [Ag(II)/Ag(I)] ratio which is 4.5 orders of magnitude lower than that producing a potential of 1.90 volts at 25° C.

Two dissolutions of PuO$_2$ with Ag(II) were carried out. In the first experiment (76-56), the anolyte was 60 ml of 4M HNO$_3$+0.005M Ag, the temperature was 25° C., and the anolyte solution potential (corrected to the hydrogen electrode scale) varied from 1.84 to 1.89 volts. The second experiment was the same except that the temperature was 80° C. The results are shown in Table 4. The spectacularly rapid dissolution of PuO$_2$ at 25° C. is at this time unique; no other dissolvent for PuO$_2$ being known which will produce such rates at 25° C. The fast dissolution in 0.005M Ag at 80° C., where only a small fraction of the Ag is in the oxidized state, also emphasizes the efficiency of Ag(II), which is probably related to its fast electron-exchange rate.

TABLE 3

Determination of Solution Potential as a Function of Temperature

| Solution, Volts | | Temperature, °C. | | | |
|---|---|---|---|---|---|
| Calomel | H Std. | Anolyte | Calomel | Amps | Applied, Volts |
| Anolyte: 60 ml of 4 M HNO$_3$ + 0.005 M Ce | | | | | |
| Catholyte: 60 ml of 8 M HNO$_3$ | | | | | |
| 1.490 | 1.705 | 105 | 61 | 2.52 | 1.32 |
| 1.491 | 1.700 | 93 | 60 | 2.23 | 1.20 |
| 1.480 | 1.701 | 81 | 54 | 2.00 | 1.40 |
| 1.476 | 1.701 | 70 | 47 | 1.94 | 1.38 |
| 1.475 | 1.706 | 59 | 40 | 1.89 | 1.40 |
| 1.474 | 1.708 | 52 | 36 | 2.01 | 1.40 |
| 1.474 | 1.710 | 47 | 33 | 2.05 | 1.50 |
| 1.472 | 1.709 | 42 | 31 | 1.94 | 1.55 |
| 1.470 | 1.709 | 39 | 29 | 1.99 | 1.60 |
| 1.468 | 1.709 | 36 | 28 | 2.04 | 1.60 |
| Anolyte: 60 ml of 4 M HNO$_3$ + 0.005 M Ag | | | | | |
| Catholyte: 60 ml of 3 M HNO$_3$ | | | | | |
| 1.366 | 1.587 | 94 | 53 | 2.058 | 2.50 |
| 1.326 | 1.507 | 105 | 59 | 2.151 | 2.50 |
| 1.470 | 1.694 | 81 | 49 | 1.798 | 2.55 |
| 1.584 | 1.816 | 61 | 38 | 1.819 | 2.55 |
| 1.628 | 1.865 | 49 | 31 | 1.874 | 2.70 |
| 1.647 | 1.887 | 42 | 28 | 1.900 | 2.90 |
| 1.650 | 1.890 | 38 | 26 | 1.942 | 3.00 |
| 1.652 | 1.895 | 32.5 | 23.5 | 1.874 | 3.00 |
| Anolyte: 60 ml of 4 M HNO$_3$ − 0.005 M Ag − 0.005 M Ce | | | | | |
| Catholyte: 60 ml of 8 M HNO$_3$ | | | | | |
| 1.495 | 1.715 | 100 | 53.5 | 2.148 | 2.6 |
| 1.498 | 1.718 | 95 | 54 | 1.955 | 2.6 |
| 1.500 | 1.721 | 90 | 52 | 1.960 | 2.6 |
| 1.502 | 1.725 | 85 | 50 | 1.970 | 2.6 |
| 1.518 | 1.743 | 80 | 47 | 2.000 | 2.6 |
| 1.527 | 1.754 | 75 | 45 | 1.956 | 2.6 |
| 1.547 | 1.776 | 70 | 42 | 1.998 | 2.65 |
| 1.576 | 1.807 | 65 | 39 | 2.002 | 2.70 |
| 1.595 | 1.828 | 60 | 37 | 1.940 | 2.70 |
| 1.629 | 1.866 | 50 | 31.5 | 2.001 | 2.90 |
| 1.641 | 1.880 | 45 | 29 | 2.011 | 3.00 |
| 1.649 | 1.890 | 40 | 26 | 2.001 | 3.05 |

TABLE 3-continued

Determination of Solution Potential as a Function of Temperature

| Solution, Volts | | Temperature, °C. | | | |
|---|---|---|---|---|---|
| Calomel | H Std. | Anolyte | Calomel | Amps | Applied, Volts |
| 1.653 | 1.895 | 34.5 | 25 | 1.874 | 3.15 |

TABLE 4

PuO$_2$ Dissolution Using Silver as the Oxidation Catalyst

Electrolytic Cell Conditions

| Time Min. | Solution, Volts | Anolyte, °C. | Amps | Applied Volts | Percent PuO$_2$ Dissolved |
|---|---|---|---|---|---|
| Experiment 76-56 | | | | | |
| Surface Area: 4.47 m$^2$/(900° C. PuO$_2$) | | | | | |
| Anolyte: 60 ml of 4 M HNO$_3$ + 0.005 M Ag @ 25° C. | | | | | |
| Catholyte: 60 ml of 8 M HNO$_3$ | | | | | |
| PuO$_2$: 0.1320 g | | | | | |
| 3 | 1.577 | 25 | 2.4 | 5.34 | — |
| 5 | 1.589 | 27 | — | 9.725 | 18.4 |
| 33 | 1.576 | 25 | — | 0.843 | 46.0 |
| 61 | 1.585 | 25 | — | 0.831 | 66.1 |
| 120 | 1.615 | 26 | — | 0.864 | 97.9 |
| 188 | 1.634 | 26 | 0.38 | 2.19 | 102.5 |
| 273 | 1.633 | 25 | — | 0.875 | 99.9 |
| Filter | | | | | 0.12 (0.16 mg) |
| Experiment 76-57 | | | | | |
| Surface Area: 4.47 m$^2$/g (900° C. PuO$_2$) | | | | | |
| Anolyte: 60 ml of 4 M HNO$_3$ + 0.005 M Ag @ 80° C. | | | | | |
| Catholyte: 60 ml of 8 M HNO$_3$ | | | | | |
| PuO$_2$: 0.1308 g | | | | | |
| 7 | 1.493 | 80 | 1.91 | 3.58 | — |
| 15 | 1.474 | 79 | 0.94 | 2.64 | 22.4 |
| 45 | 1.510 | 85 | — | — | 66.0 |
| 67 | 1.489 | 85 | — | 0.613 | 85.0 |
| 190 | 1.512 | 82 | — | 0.669 | 98.2 |
| Filter | | | | | 1.8 (2.4 mg) |

EXAMPLE 9

PuO$_2$ Dissolution Using Cobalt in HNO$_3$ as the Oxidation Catalyst

Cobalt is a potential oxidation catalyst for the electrolytic dissolution of PuO$_2$. The Co$^{2+}$⇌Co$^{3+}$+e$^-$ couple, with E°=1.82 volts is greater than that for Ce(III)/(IV). Three experiments were completed to provide evidence of successful PuO$_2$ dissolution with cobalt. Approximately 65% of the PuO$_2$ dissolved at 90° C. using 0.005M cobalt+4M HNO$_3$ as compared to 82% in 4 hours for 0.005M Cerium+4M HNO$_3$. The cobalt solution turned blue during oxidation but did not remain when the cell was off. When the test was repeated at 50° C. to determine the effect of temperature, only 19% of the PuO$_2$ dissolved in 4 hours.

A third experiment was completed to determine the effect of the nitric acid concentration using cobalt to dissolve PuO$_2$. Approximately 93% of the PuO$_2$ was dissolved in 5 hours using 0.05M Cobalt+1M HNO$_3$ as compared to complete dissolution in 68 minutes using 0.05M Cerium+1M HNO$_3$. The results for the three experiments are shown in Table 5.

TABLE 5

PuO$_2$ Dissolution Using Cobalt as the Oxidation Catalyst

Electrolytic Cell Conditions

| Time Min. | Solution, Volts | Anolyte, °C. | Amps | Applied Volts | Percent PuO$_2$ Dissolved |
|---|---|---|---|---|---|
| Experiment 76-33 | | | | | |
| Surface Area: 4.47 m$^2$/g (900° C. PuO$_2$) | | | | | |
| Anolyte: 60 ml of 0.005 M Co(II) + 4 M HNO$_3$ @ 90-100° C. | | | | | |
| Catholyte: 60 ml of 8 M HNO$_3$ | | | | | |

TABLE 5-continued
PuO$_2$ Dissolution Using Cobalt as the Oxidation Catalyst

| | Electrolytic Cell Conditions | | | | |
|---|---|---|---|---|---|
| Time Min. | Solution, Volts | Anolyte, °C. | Amps | Applied Volts | Percent PuO$_2$ Dissolved |
| PuO$_2$: 0.1314 g | | | | | |
| 15 | 1.211 | 95 | 3.1 | 5.0 | 2.7 |
| 33 | 1.339 | 92 | 3.0 | 5.0 | 5.9 |
| 68 | 1.462 | 88 | 2.8 | 5 | 13.5 |
| 168 | 1.398 | 93 | 3.3 | 5.5 | 42.1 |
| 278 | 1.404 | 95 | 2.7 | 5.7 | 77.1 |
| 358 | 1.371 | 95 | 2.5 | 5.9 | 88.6 |
| Filter | | | | | 11.4 (15.0 mg) |

Experiment 76-34
Surface Area: 4.47 m$^2$/g (900° C. PuO$_2$)
Anolyte: 60 ml of 0.005 $\underline{M}$ Co(II) + 4 $\underline{M}$ HNO$_3$ @ 50–60° C.
Catholyte: 60 ml of 8 $\underline{M}$ HNO$_3$
PuO$_2$: 0.1301 g

| 80 | 1.460 | 63 | 2.6 | 6.3 | 5.9 |
| 140 | 1.485 | 53 | 2.1 | 5.5 | 11.3 |
| 195 | 1.461 | 52 | 1.9 | 5.5 | 15.0 |
| 265 | 1.459 | 54 | 2.0 | 5.5 | 21.1 |
| 360 | — | 54 | 1.5 | 5.5 | 27.5 |
| Filter | | | | | 72.1 (93.8 mg) |

Experiment 76-49
Surface Area: 4.47 m$^2$/g (900° C. PuO$_2$)
Anolyte: 60 ml of 0.05 $\underline{M}$ Co(II) + 1 $\underline{M}$ HNO$_3$ @ 90–100° C.
Catholyte: 60 ml of 8 $\underline{M}$ HNO$_3$
PuO$_2$: 0.1301 g

| 8 | 1.476 | 94 | 3.0 | 4.83 | 5.8 |
| 31 | 1.494 | 92 | 2.8 | 4.84 | 10.1 |
| 64 | 1.505 | 90 | — | 0.609 | 21.5 |
| 120 | 1.507 | 94 | 2.95 | 5.17 | 59.2 |
| 180 | 1.501 | 94 | — | 0.648 | 69.3 |
| 241 | 1.537 | 90 | — | 0.67 | 85.9 |
| 296 | 1.534 | 90 | — | 0.68 | 93.7 |
| Filter | | | | | 6.3 (8.33 mg) |

EXAMPLE 10
PuO$_2$ Dissolution Using Neptunium in HNO$_3$ as the Oxidation Catalyst Neptunium was suggested as an oxidation catalyst for the electrolytic dissolution of PuO$_2$. The NpO$_2^+$ ⇌ NpO$_2^{2+}$ + e$^-$ couple with E° = 1.15 volts was tested with little, if any, success. Approximately 25–35% of the PuO$_2$ dissolved in 3–4 hours when the anode compartment contained 4M HNO$_3$ + 0.005M Np. In a previous investigation, similar results were obtained for 1M HCO$_3$ when the electrolytic cell was operated without an additional oxidizing catalyst.

These results are significant in interpreting other experiments, as will appear later.

EXAMPLE 11
Dissolution in Synthetic Dissolver Solution

A large number of experiments were run using the synthetic dissolver solution of Table 1 as the source of the dissolution catalyst. Initial tests at 1.4M U and 4M HNO$_3$ indicated that initial PuO$_2$ dissolution rates were rapid, but as the solution potential increased to the point where most of the cerium was oxidized, the dissolution slowed drastically and a finely divided red mud-like precipitate formed.

By far the most effective means of increasing the dissolution rate was to dilute the dissolver solution with nitric acid.

In the above experiments, using synthetic dissolver solution containing 1.4M U(VI) and 4M HNO$_3$, the PuO$_2$ dissolution rate was shown to a lower than for 4M HNO$_3$ + 0.005M Ce. The objective of Experiment 75-12 was to determine the effect of a 50 percent dilution of the dissolver solution on PuO$_2$ dissolution. The results in Table 6 show nearly complete PuO$_2$ dissolution in 3 hours as compared to 10 hours required for full level dissolver solution. In addition, the anode solution became cloudy in 46 minutes, but no red precipitate was formed during the dissolution of PuO$_2$.

TABLE 6
PuO$_2$ Dissolution in Diluted Synthetic Dissolver Solution
Experiment 75-12
Surface Area: 12.8 m$^2$/g (900° C. PuO$_2$)
Anolyte: 60 ml of 0.7 $\underline{M}$ U(VI) Synthetic Dissolver Solution 4 $\underline{M}$ HNO$_3$ + 0.0025 $\underline{M}$ Ce(III)
Catholyte: 60 ml of 4 $\underline{M}$ HNO$_3$
PuO$_2$: 0.1264 g

| | Electrolytic Cell Conditions | | | | | |
|---|---|---|---|---|---|---|
| Time Min. | Solution, Volts | Anolyte, °C. | Amps | Applied Volts | Percent PuO$_2$ Dissolved | Percent Ce(IV) |
| 0 | 1.003 | 98 | — | — | — | — |
| 2 | 1.374 | 99 | 6.08 | 8.2 | — | 17 |
| 6 | 1.418 | 100 | 6.10 | 8.3 | 7.4 | 45 |
| 16 | 1.440 | 98 | 6.82 | 8.1 | 23.3 | 62.5 |
| 33 | 1.449 | 101 | 7.01 | 10.0 | 55.1 | 67.5 |
| 46 | | | Anolyte solution turning cloudy | | | |
| 61 | 1.466 | 101 | 6.71 | 10.0 | 87.9 | 78 |
| 90 | 1.458 | 101 | 1.08 | 3.65 | 91.3 | 73 |
| 101 | 1.482 | 99 | 1.08 | 3.3 | — | 85.5 |
| 125 | 1.474 | 102 | 1.06 | 3.23 | 95.1 | 81.5 |
| 182 | 1.482 | 101 | 1.02 | 3.4 | 101.3 | 85.5 |
| Filter | — | — | — | — | 0.3 (0.4 mg) | |

EXAMPLE 12
Dissolution Using Americium

Experiments were made adding 0.005 to 0.01M Pu nitrate (containing 1% Am nitrate) to 4M HNO$_3$ and subjecting PuO$_2$ to electrolytic dissolution in the resulting solutions.

The results are shown in Table 7. Experiment 76-23 determined the effect of adding 0.01M Pu nitrate to a solution of 4M HNO$_3$ containing PuO$_2$. The solution was placed in the anode compartment of the electrocell, and the cell was operated at a high current density. Approximately 55 percent of the PuO$_2$ dissolved in 5 hours. When the Pu nitrate concentration was reduced to 0.005M (76-24), the same dissolution rate was maintained. An earlier experiment had shown a very low PuO$_2$ dissolution rate in 4M HNO$_3$ without electrolysis. Experiment 76-25 was performed to determine the dissolution rate for PuO$_2$ in 4M HNO$_3$ + 0.005M Pu(IV) nitrate, without electrolysis. Approximately 11 percent of the $PuO_2$ dissolved in 5 hours, as compared to 2-3 percent in nitric acid only. Test 76-26 as performed to determine the dissolution rate of $PuO_2$ using only 4M $HNO_3$ in the anode compartment, at a high current density, without the use of cerium or added Pu. Electrolysis increases the dissolution rate for $PuO_2$; approximately 32 percent of the $PuO_2$ dissolved in 5 hours. No change in dissolution rate was noted when 76-26 was repeated using 1M $HNO_3$ (76-31).

TABLE 7

$PuO_2$ Dissolution - Pu Nitrate/1% Am

Electrolytic Cell Conditions

| Time Min. | Solution, Volts | Anolyte, °C. | Amps | Applied Volts | Percent $PuO_2$ Dissolved |
|---|---|---|---|---|---|
| Experiment 76-23 | | | | | |
| Surface Area: 4.47 m²/g (900° C. $PuO_2$) | | | | | |
| Anolyte: 60 ml of 0.01 M Pu(IV) nitrate + 4 M $HNO_3$ | | | | | |
| Catholyte: 60 ml of 8 M $HNO_3$ | | | | | |
| $PuO_2$: 0.1303 g | | | | | |
| 30 | 1.035 | 98 | 6.5 | 10.1 | 4.2 |
| 60 | 1.043 | 100 | 7.4 | 10.1 | 10.2 |
| 123 | 1.121 | 100 | 4.0 | 6.9 | 18.8 |
| 183 | 1.158 | 103 | 3.8 | 7.6 | 30.0 |
| 253 | 1.138 | 102 | 3.5 | 7.8 | 46.2 |
| 353 | — | 102 | 3.3 | 7.8 | 63.0 |
| Filter | | | | | 37.0 |

| Time, Min. | Temperature, °C. | Percent $PuO_2$ Dissolved |
|---|---|---|
| Experiment 76-25 | | |
| Surface Area: 4.47 m²/g (900° C. $PuO_2$) | | |
| Dissolvent: 60 ml of 0.005 M Pu(IV) nitrate + 4 M $HNO_3$ | | |
| $PuO_2$: 0.132 g | | |
| 115 | 101 | 4.9 |
| 171 | 101 | 7.6 |
| 243 | 101 | 8.5 |
| 300 | 101 | 8.0 |
| 360 | 101 | 10.6 |
| Filter | — | 89.4 |

Electrolytic Cell Conditions

| Time Min. | Solution, Volts | Anolyte, °C. | Amps | Applied Volts | Percent $PuO_2$ Dissolved |
|---|---|---|---|---|---|
| Experiment 76-26 | | | | | |
| Surface Area: 4.47 m²/g (900° C. $PuO_2$) | | | | | |
| Anolyte: 60 ml of 4 M $HNO_3$ | | | | | |
| Catholyte: 60 ml of 8 M $HNO_3$ | | | | | |
| $PuO_2$: 0.1304 g | | | | | |
| 48 | 1.045 | 99 | 7.2 | 11.2 | 2.8 |
| 112 | 1.126 | 99 | 7.0 | 12.5 | 9.2 |
| 169 | 1.130 | 100 | 7.0 | 13.5 | 15.4 |
| 237 | 1.137 | 102 | 7.2 | 11.2 | 24.1 |
| 282 | 1.183 | 102 | 6.7 | 11.2 | 31.9 |
| 370 | 1.222 | 99 | 6.0 | 14.5 | 39.2 |
| Filter | | | | | 60.8 (76.3 mg) |

Electrolytic Cell Conditions

| Time Min. | Solution, Volts | Anolyte, °C. | Amps | Applied Volts | Percent $PuO_2$ Dissolved |
|---|---|---|---|---|---|
| Experiment 76-24 | | | | | |
| Surface Area: 4.47 m²/g (900° C. $PuO_2$) | | | | | |
| Anolyte: 60 ml of 0.005 M Pu(VI) nitrate + 4 M $HNO_3$ | | | | | |
| Catholyte: 60 ml of 8 M $HNO_3$ | | | | | |
| $PuO_2$: 0.1300 g | | | | | |
| 30 | 1.008 | 98 | 6.5 | 10.0 | 6.1 |
| 62 | 1.048 | 100 | 7.1 | 11.0 | 12.3 |
| 120 | 1.093 | 101 | 7.1 | 13.0 | 22.2 |
| 183 | 1.230 | 85 | 3.0 | 9.0 | 35.7 |

TABLE 7-continued $PuO_2$ Dissolution - Pu Nitrate/1% Am

| 305 | 1.145 | 104 | 3.9 | 7.3 | 55.7 |
|---|---|---|---|---|---|
| 365 | 1.152 | 103 | — | — | 62.9 |
| Filter | — | — | — | — | 37.1 |

Electrolytic Cell Conditions

| Time Min. | Solution, Volts | Anolyte, °C. | Amps | Applied Volts | Percent $PuO_2$ Dissolved |
|---|---|---|---|---|---|
| Experiment 76-31 | | | | | |
| Surface Area: 4.47 m²/g (900° C. $PuO_2$) | | | | | |
| Anolyte: 60 ml of 1 M $HNO_3$ | | | | | |
| Catholyte: 60 ml of 8 M $HNO_3$ | | | | | |
| $PuO_2$: 0.1302 g | | | | | |
| 60 | 0.982 | 101 | 7.1 | 12.2 | 2.4 |
| 65 | 1.073 | 100 | 6.3 | 12.2 | 6.1 |
| 185 | 1.136 | 100 | 6.5 | 12.2 | 11.1 |
| 255 | 1.073 | 100 | 6.6 | 11.0 | 20.9 |
| 305 | 1.187 | 100 | 6.6 | 11.0 | 26.0 |
| 388 | 1.078 | 100 | 6.3 | 11.0 | 35.4 |
| Filter | | | | | 64.6 (84.1 mg) |

The reasons for believing the americium to be the effective catalyst are as follows:

The effectiveness of the catalyst appears to depend on the oxidation potential of its couple in solution. Note the following values:

| Pu(V)—Pu(VI) | 0.916 Volts |
|---|---|
| Np(V)—Np(VI) | 1.15 Volts |
| Am(V)—Am(VI) | 1.60 Volts |

As shown above, neptunium was ineffective. Hence, we feel that the dissolution rates are due to the americium, rather than the plutonium added.

DISSOLUTION OF IRRADIATED FUEL

A number of experiments were performed with actual irradiated fuel dissolver solutions, without catalysts other than those present as fission products or nuclear reaction products.

EXAMPLE 13

Four dissolutions and a control were run with irradiated $UO_2$ fuel from the Shippingport, Pa., reactor. This fuel had been irradiated to about 34,000 MWd/tonne peak exposure. In the first two experiments 8M $HNO_3$ and 8M $HNO_3$-0.1M HF were used without electrolysis for four hours each. The black residual solids obtained on 0.025 μm filtration contained 1.3% and 0.5% respectively of the total Pu in the fuel and 26% and 13%, respectively, of the Ru.

In the first electrolytic dissolution experiment, 34.3 g of Shippingport fuel was added to 85 ml of 8M $HNO_3$ and heated to 95° C. for four hours without electrolysis. The concentration of the dissolver solution was then adjusted to 4M $HNO_3$, 1.4M U, making a volume of 90 ml. This and the solids were transferred to the anode compartment of the electrolytic cell and 100 ml of 10M $HNO_3$ was placed in the cathode compartment. Conditions and results are shown in Table 8.

TABLE 8

Dissolution of Shippingport $UO_2$ Fuel - Oxidative Dissolution (1.4 M U)

Electrolytic Cell Conditions

| Time, Min. | Solution, Volts | Anolyte, °C. | Amps | Applied, Volts | Observations |
|---|---|---|---|---|---|
| 0 | 0.955 | 90 | — | — | Solution black |
| 5 | 1.400 | 104 | 4.1 | 8.61 | |
| 35 | 1.420 | 103 | 4.0 | 8.43 | Solution clear |
| 80 | 1.440 | 107 | 4.1 | 8.45 | Stirring bar visible |

TABLE 8-continued

Dissolution of Shippingport UO$_2$ Fuel - Oxidative Dissolution (1.4 M U)

| | | | | | |
|---|---|---|---|---|---|
| 110 | 1.473 | 104 | 3.0 | 6.30 | Solution murky |
| 140 | 1.415 | 97 | 2.9 | 6.33 | |
| 171 | 1.460 | 97 | 3.0 | 6.13 | Clear |
| 290 | 1.492 | 96 | 2.9 | 6.13 | |
| 350 | 1.518 | 96 | 2.7 | 6.23 | |
| Filter | — | — | — | — | |

| Solution | Found in Dissolver After 235 Minutes, % | Found in Solids, % |
|---|---|---|
| Cs-134 | 99.9 | 0.1 |
| Cs-137 | 99.9 | 0.1 |
| Eu-154 | 99.9 | 0.1 |
| Ru-106 | — | — |
| Pu | 99.8 | 0.2 |
| Am-241 | 99.85 | 0.15 |
| Cm-244 | 99.9 | 0.1 |

The control (a second filtration of the same dissolver solution) also gave a reading of 0.21% Pu, showing that actually this was background cross-contamination and that actually all the PuO$_2$ had dissolved.

In another run, 14.66 g Shippingport fuel was added to 25 ml 8M HNO$_3$ and the experiment was repeated. All conditions and results are shown in Table 9.

TABLE 9

Dissolution of Shippingport UO$_2$ Fuel - Oxidative Dissolution (0.6 M U)

| | Electrolytic Cell Conditions | | | | |
|---|---|---|---|---|---|
| Time, Min. | Solution, Volts | Anolyte, °C. | Amps | Applied, Volts | Observations |
| 0 | 0.950 | 85 | — | — | |
| 15 | 1.011 | 98 | 3.4 | 7.23 | |
| 44 | 1.330 | 94 | 3.9 | 7.58 | |
| 69 | 1.320 | 94 | 4.1 | 7.77 | Solution clear |
| 75 | 1.382 | 95 | 4.2 | 7.77 | |
| 100 | 1.456 | 95 | 4.2 | 7.67 | Color change |
| 105 | 1.453 | — | 1.9 | 4.16 | to bright red |
| 175 | 1.460 | 91 | 3.2 | 6.14 | Solution murky |
| 235 | 1.464 | 95 | 2.5 | 4.97 | |
| Filter | — | — | — | — | |

| Solution | Found in Dissolver After 235 Minutes, % | Found in Solids, % |
|---|---|---|
| CS-134 | 98.1 | 1.8 |
| Cs-137 | 99.6 | 0.3 |
| Eu-154 | 99.8 | 0.2 |
| Ru-106 | <18.2 | <3.4 |
| Pu | 99.75 | 0.2 |
| Am-241 | 99.8 | 0.2 |
| Cm-244 | 99.8 | 0.2 |

EXAMPLE 14

Dissolution of 900° C. Fired PuO$_2$ (12.8 m$^2$/g) in Filtered Saxton Dissolver Solution Fuel which had been irradiated in the Saxton reactor formerly located near Pittsburgh, Pa., to a peak exposure of about 26,500 MWd/tonne was used to prepare dissolver solutions. This was a mixed oxide 5 wt% PuO$_2$—UO$_2$ fuel. It had been prepared by mechanically mixing −325 mesh PuO$_2$ and −200 mesh UO$_2$ in a blender and pelletizing, sintering in an H$_2$—N$_2$ atmosphere for 4 hours at 1700° C. For the first experiment, 10 g of this fuel was dissolved in 50 ml of 8M HNO$_3$ at 80° C. for 4 hours. The resulting dissolved solution was filtered and diluted with water to 70 ml (0.53M U), (5.7M HNO$_3$), mixed with 0.113 g of PuO$_2$ having a surface area of 12.8 m/g, and placed in the anode compartment of the cell; 70 ml of 4M HNO$_3$ was placed in the cathode compartment. The anode compartment was swept by air to remove RuO$_4$, which was retained by passing the air through a series of 10M NaOH traps.

Conditions and results are shown in Table 10.

TABLE 10

Dissolution in Saxton 5 wt % PuO$_2$—UO$_2$ Fuel Dissolver Solution

| | | Temperature, °C. | | | | Percent PuO$_2$ |
|---|---|---|---|---|---|---|
| Time, Min. | Solution, Volts | Anolyte | Calomel | Amps | Applied, Volts | Dissolved |
| 0 | 0.920 | 85 | 65 | — | — | — |
| 5 | 0.962 | 91 | 65 | 3.0 | 5.535 | — |
| 10 | 1.067 | 92 | 65 | 3.0 | 5.490 | — |
| 20 | 1.162 | 89 | 62 | 3.0 | 5.479 | — |
| 35 | 1.190 | 90 | 60 | 3.0 | 4.618 | — |
| 45 | 1.216 | 92 | 62 | 3.0 | 4.658 | — |
| 55 | 1.252 | 92 | 62 | 3.0 | 4.703 | — |
| 65 | 1.284 | 92 | 62 | 3.0 | 4.832 | — |
| 75 | 1.320 | 92 | 62 | 3.0 | 4.702 | — |
| 85 | 1.360 | 92 | 62 | 3.0 | 4.721 | — |

TABLE 10-continued

Dissolution in Saxton 5 wt % PuO$_2$—UO$_2$ Fuel Dissolver Solution

| Time, Min. | Solution, Volts | Temperature, °C. Anolyte | Calomel | Amps | Applied, Volts | Percent PuO$_2$ Dissolved |
|---|---|---|---|---|---|---|
| 96 | 1.357 | 92 | 63 | 3.0 | 4.925 | — |
| 108 | 1.430 | 92 | 63 | 3.0 | 4.945 | — |
| 126 | 1.442 | 92 | 63 | 3.0 | 5.397 | — |
| 141 | 1.448 | — | — | 3.0 | 5.748 | — |
| 153 | 1.449 | 94 | 65 | 3.1 | 5.732 | — |
| 168 | 1.445 | 94 | 65 | 3.1 | 5.732 | — |
| Filter | — | — | — | — | — | (67.4% PuO$_2$ Undissolved) |

A decontamination factor for Ru of 5 was found in comparing the original dissolver solution with the final solution and solids.

EXAMPLE 15

Dissolution of Saxton Solids in Dissolver Solution

A sample of Saxton 5 wt% PuO$_2$—UO$_2$ fuel was dissolved in HNO$_3$ at 90° C. for 4 hours. The residual solids containing 17% PuO$_2$ and dissolver solution were added to the anode compartment for oxidative dissolution. The solution potential increased slowly requiring 165 minutes to approach 1.45 volts, concurrent with the loss of Ru. After 225 minutes, the anode solution was filtered and the solids analyzed. The results show that 13% of the total PuO$_2$ in the fuel remained undissolved after 225 minutes of anodic dissolution. A second Saxton dissolver solution was prepared and the above experiment repeated for a total of 585 minutes. The final filtered solids still contained 12% of the undissolved PuO$_2$.

EXAMPLE 16

Dissolution of Saxton Dissolver Solids in 4M HNO$_3$+0.005M Ce

Separated Saxton dissolver solids will not dissolve more readily by oxidative dissolution using 4M HNO$_3$+0.005M Ce than in the more complicated dissolver solution.

Saxton 5 wt% PuO$_2$—UO$_2$ fuel (13.16 g) was dissolved in 25 ml of 8M HNO$_3$ by heating to 95° C. for 4 hours. The remaining solids were separated from the dissolver solution by filtration. It was determined that 18.6% of the Pu initially in the Saxton fuel was found in the undissolved solids. The solids and the Millipore filter media was added to the anode compartment containing 4M HNO$_3$+0.005M Ce (III). A previous investigation had shown that the filter, containing mixed esters of cellulose, would be completely destroyed in the anode compartment during the first 15 minutes of cell operation, leaving the filtered solids suspended in the anode solution. Approximately 23 and 44% of the PuO$_2$ found in the residue dissolved after 3 and 5.5 hours of oxidative dissolution. These results are similar to previous studies in which the dissolver solution and solids were not separated prior to oxidative dissolution.

EXAMPLE 17

Dissolution of Neptunium Dioxide

The following experiments compare the dissolution of NpO$_2$ in nitric acid in the presence of cerium with and without electrolysis and in the presence of Np with electrolysis.

Approximately 10% of a NpO$_2$ sample dissolved in 4M HNO$_3$+0.05M Ce(III) at 90° C. in 2 hours. When the test was repeated in the electrolytic cell with Ce(IV), the dissolution of NpO$_2$ was so fast that the solution was clear and free of solids within 13 minutes. When the test was repeated using 4M HNO$_3$+0.005M Np as the oxidation catalyst, approximately 35% of the NpO$_2$ dissolved in 200 minutes. The results are shown in Table 31.

TABLE 31

NpO$_2$ Dissolution Using Cerium in HNO$_3$ as a Function of Time

| Time, Min. | Temperature, °C. | Percent NpO$_2$ Dissolved |
|---|---|---|
| Experiment 76-59 Dissolvent: 60 ml of 4 M HNO$_3$ + 0.05 M Ce NpO$_2$: 0.1308 g | | |
| 11 | 80 | 4.5 |
| 30 | 87 | 0.8 |
| 60 | 92 | 7.6 |
| 120 | 90 | 9.2 |
| Filter | | 90.8 (97.1 mg) |

Electrolytic Cell Conditions

| Time, Min. | Solution, Volts | Anolyte °C. | Amps | Applied, Volts | Percent NpO$_2$ Dissolved | Percent Ce(IV) |
|---|---|---|---|---|---|---|
| Experiment 76-58 Anolyte: 60 ml of 4 M HNO$_3$ + 0.05 M Ce Catholyte: 60 ml of 8 M HNO$_3$ NpO$_2$: 0.1312 g | | | | | | |
| 0 | 1.451 | 90 | 4.21 | 6.76 | — | 74.5 |
| 7 | 1.464 | 90 | — | — | 82.1 | 81.5 |
| 11 | 1.480 | 91 | 4.16 | 6.77 | 82 | 88 |

Did not filter. Solution very clear - poor material balance.

Electrolytic Cell Conditions

| Time, Min. | Solution, Volts | Anolyte °C. | Amps | Applied, Volts | Percent NpO$_2$ Dissolved |
|---|---|---|---|---|---|
| Experiment 76-65 Anolyte: 60 ml of 4 M HNO$_3$ + 0.005 M Np Catholyte: 60 ml of 8 M HNO$_3$ NpO$_2$: 0.1332 g | | | | | |
| 17 | 1.125 | 95 | 2.93 | 5.56 | 9.0 |
| 35 | 1.632 | 90 | 2.89 | 5.57 | 17.4 |
| 65 | 1.664 | 90 | 2.93 | 5.56 | 9.0? |
| 140 | 1.316 | 90 | 2.82 | 5.57 | 34.4 |
| 200 | 1.121 | 90 | — | — | 35.6 |
| Filter | | | | | 64.4 |

While we have shown numerous specific embodiments of our invention, it will be obvious to persons skilled in the art that various other changes can be made. For example, other acids may be used. We have found perchloric acid, HClO$_4$ to be operative and other nonoxidizable acids could be employed. We therefore wish our invention to be limited only by the scope of the appended claims.

What is claimed is:

1. A process of dissolving oxidatively an irradiated oxide reactor fuel containing plutonium dioxide, which comprises dissolving said fuel in hot nitric acid substantially free of hydrogen fluoride, thereby forming a dissolver solution and residual solids, transferring said solution and residual solids to the anode compartment of an electrolytic cell having a cathode compartment and an anode compartment separated by a diffusion barrier, and without adding a catalyst to said dissolver solution, impressing a potential across said cell, maintaining the temperature of said cell sufficiently high, with the potential sufficiently high to evolve gaseous oxygen from the anode, for a time sufficient to dissolve at least a substantial portion of said solids, while passing a non-reducing sweep gas through said anode compartment to remove ruthenium as gaseous $RuO_4$.

2. A process as defined in claim 1 wherein said sweep gas is air.

* * * * *